United States Patent [19]
Grann et al.

[11] Patent Number: 6,038,028
[45] Date of Patent: Mar. 14, 2000

[54] HIGH-SPEED NON-CONTACT MEASURING APPARATUS FOR GAUGING THE THICKNESS OF MOVING SHEET MATERIAL

[75] Inventors: Eric B. Grann, San Ramon, Calif.; David E. Holcomb, Oak Ridge, Tenn.

[73] Assignee: Lockheed Martin Energy Research Corp., Oak Ridge, Tenn.

[21] Appl. No.: 09/140,263

[22] Filed: Aug. 26, 1998

[51] Int. Cl.[7] .................................................. G01B 11/06
[52] U.S. Cl. ........................................... 356/381; 356/382
[58] Field of Search ..................................... 356/381, 382

[56] References Cited

U.S. PATENT DOCUMENTS

| 5,210,593 | 5/1993 | Kramer | 356/381 |
| 5,581,353 | 12/1996 | Taylor | 356/381 |

OTHER PUBLICATIONS

Göpel, W., Hesse, J. and Zemel, J.N., *A Comprehensive Survey*, vol. 6, Optical Sensors, 1992, pp. 566–570.

*Primary Examiner*—Robert H. Kim
*Attorney, Agent, or Firm*—Quarles & Brady LLP

[57] ABSTRACT

An optical measurement apparatus is provided for measuring the thickness of a moving sheet material (18). The apparatus has a pair of optical measurement systems (21, 31) attached to opposing surfaces (14, 16) of a rigid support structure (10). A pair of high-power laser diodes (20, 30) and a pair of photodetector arrays (22, 32) are attached to the opposing surfaces. Light emitted from the laser diodes is reflected off of the sheet material surfaces (17, 19) and received by the respective photodetector arrays. An associated method for implementing the apparatus is also provided.

19 Claims, 3 Drawing Sheets

HIGH-SPEED NON-CONTACT MEASURING APPARATUS FOR GAUGING THE THICKNESS OF MOVING SHEET MATERIAL

STATEMENT REGARDING FEDERALLY SPONSORED RESEARCH OR DEVELOPMENT

This invention was made with government support under contract DE-AC05-96OR22464, awarded by the United States Department of Energy to Lockheed Martin Energy Research Corporation, and the United States Government has certain rights in this invention.

FIELD OF THE INVENTION

This invention relates generally to the measurement of sheet material thickness, and more particularly to an optical measurement system for measuring the thickness of moving sheet materials.

BACKGROUND OF THE INVENTION

A variety of products are manufactured as continuous sheets of material. For instance, products produced in sheet form are common in the paper, ceramic, aluminum, steel and glass manufacturing industries. It is often necessary to monitor sheet thickness during production as a quality control measure. For years, several industries have publicized the need for improved systems capable of more accurately and efficiently measuring the thickness of rapidly moving sheet materials. A number of non-contact measuring systems have been devised for performing such measurements.

Mass gauges are the most commonly used devices for performing thickness measurements of moving sheet material. Mass gauge technology is based on gamma- or x-ray radiation attenuation, whereby a radiation source and a detector are positioned on opposing sides of the moving sheet. The radiation source emits photons which pass through the sheet. The quantity of photons passing through the sheet per unit time is measured by the detector. Use of this technology is limited due to its high nonlinear dependence on the elemental composition of the sheet material. For this technology to be accurate, the precise alloy composition of the measured sheet must be known. The usefulness of radiation attenuation gauges is further restricted by the limited strength of available radiation sources. In other words, known radiation sources can only emit a limited quantity of photons in a given time. As a result, thickness calculations require time-averaging of measurements, precluding the collection of prompt measurements. As sheet movement speed is increased, the quantity of photons detected per unit sheet length decreases, thereby limiting the quantity of photons available to measure thickness and resulting in an increase in measurement uncertainty.

Optically-based thickness gauges provide an alternate means for measuring sheet thickness. Auto-focus profilometry is one example of an optically-based thickness gauge technology. Here, detectors operate by focusing a light beam onto a surface through a movable lens. Reflected light traveling along a uniform path is deflected by a beam splitter and then directed toward a pair of photodetectors. The photodetectors are arranged such that each detector receives an equal portion of light when the measurement surface is located at the focal point of the movable lens. As the measured surface is moved, the ratio of light intensity incident on the respective detectors shifts. The ratio of electrical signals transmitted from the photodetectors is used to reposition the movable lens such that the surface remains in focus. Knowledge of the focal characteristics and lens positions are used to calculate the distance to the surface. A more detailed description of this technique is found in U.S. Pat. No. 5,696,589. The accuracy and measurement speed of this technique is limited due to its incorporation of a mechanically moving component. Moreover, commercially-available systems often accept only a limited range of object motion, do not provide a means for correcting for films disposed on the surface being measured, and require complex and expensive components.

Optical triangulation-based profilometry is another example of a known optically-based measurement technology. The general concept underlying triangulation-based distance measurement is as follows: as an observed object moves relative to a fixed illumination and observer system, the object's movement results in a predictable change in its observed position. Generally, a light beam is focused on the surface of the object being measured and light scattered from the object surface is reflected at a known angle ($\alpha$), through an imaging lens, to form a spot upon a position-sensitive photodetector. The relative location of the spot on the photodetector is defined as the spot centroid position. Referring to FIG. 1, changes in the distance between the optical system and the surface being measured result in a corresponding change in the position of the spot on the photodetector. Here, the dotted lines represent a displacement of the measured surface and the corresponding displacement of the reflected light beam. The relationship between surface displacement, t, and other optical system variables is defined by the following formula:

$$t = [t'd]/[(b \sin^2 \alpha) + (t' \sin \alpha \cos \alpha)]$$

where,
 t'=the displacement of the spot on the photodetector
 d=the distance between the incident light beam and the intersection of the reflected light beam with the imaging lens
 b=the distance between the imaging lens and the photodetector
 $\alpha$=the angle of reflection of the incident light beam With knowledge of the distance between the respective optical systems, triangulation measurements performed on opposing surfaces of a sheet material can be used to calculate sheet thickness. Sheet thickness is calculated by subtracting the distance between the optical systems and the respective upper and lower sheet surfaces from the distance between the respective optical systems. However, dual-side triangulation is generally not used due to the relatively slow speeds at which available optical measurement devices operate. To incorporate a triangulation-based measurement system for calculating moving sheet thickness, it is necessary to provide a measurement device capable of accurately performing measurements at a much higher rate than is possible using available optical measurement systems.

For the foregoing reasons, it would be desirable to provide an optical measurement apparatus useful for performing simultaneous high-speed triangulation measurements on opposing sides of a moving sheet of material. It would be further desirable for the aforementioned apparatus to be amenable to performing high-speed thickness measurements for sheet materials having translucent surface coatings and/or highly-reflective surfaces.

SUMMARY OF THE INVENTION

Briefly, according to the invention, there is provided an optical measurement apparatus for measuring the thickness of a moving sheet material. A support structure having opposing surfaces is provided for attachment of optical measurement components. Identical optical systems, each comprising a high power light source and a photodetector array, are provided on the opposing surfaces of the support structure. As a sheet material is passed through the support structure, the optical systems measure the distance between the respective optical systems and opposing upper and lower sheet surfaces. The respective distances are subtracted from the total distance between the respective measurement systems to calculate sheet thickness.

In particular, light emitted from each high power light source is directed toward a sheet surface. A portion of the light reflected off of the sheet surface is detected as a light spot imaged on the photodetector array. Each photodetector array is comprised of a plurality of individual photodetectors integrated on the surface of an integrated circuit (IC) chip. The IC also includes a plurality of current measurement circuits and a single centroid measurement circuit.

The individual photodetectors each communicate with individual current measurement circuits. The current measurement circuits all communicate with a common centroid measurement circuit. Each photodetector operates as a semiconductor diode type detector, converting incident photon intensity into an electrical current. The current levels are proportional to the intensity of light received by the photodetectors. The electrical signals, or currents, are transmitted to the centroid measurement circuit in parallel. The centroid measurement circuit calculates the centroid of the spot based upon the relative current levels received by the individual photodetectors comprising the array. The parallel transmission of current levels to the centroid circuitry increases centroid calculation speed. Combining the photodetector array, current measurement circuitry, and centroid measurement circuitry on a single IC reduces signal path lengths, further increasing measurement speed.

In an alternate embodiment of the present invention, a standard optical profilometer is incorporated into at least one of the above-described optical systems. This embodiment is preferred for measuring sheet materials having a translucent coating disposed on at least one of the measured surfaces.

DETAILED DESCRIPTION OF PREFERRED EMBODIMENTS

Figure 1:
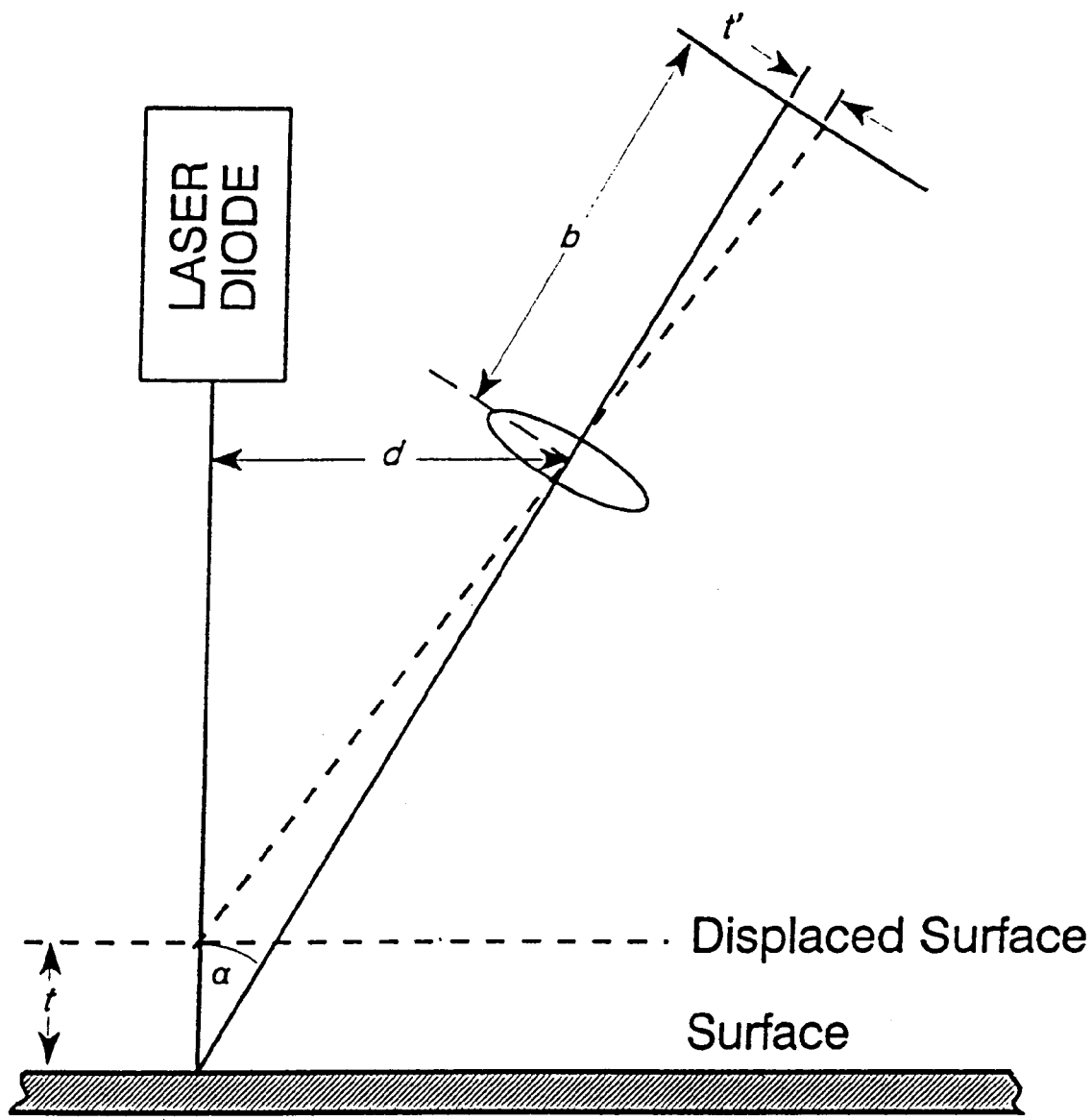
FIG. 1 is a geometric representation of standard triangulation-based distance measurement, in accordance with the prior art.

While the specification concludes with claims defining the features of the invention that are regarded as novel, it is believed that the invention will be better understood from a consideration of the following description in conjunction with the drawing figures, in which like reference numerals are carried forward.

Figure 2:
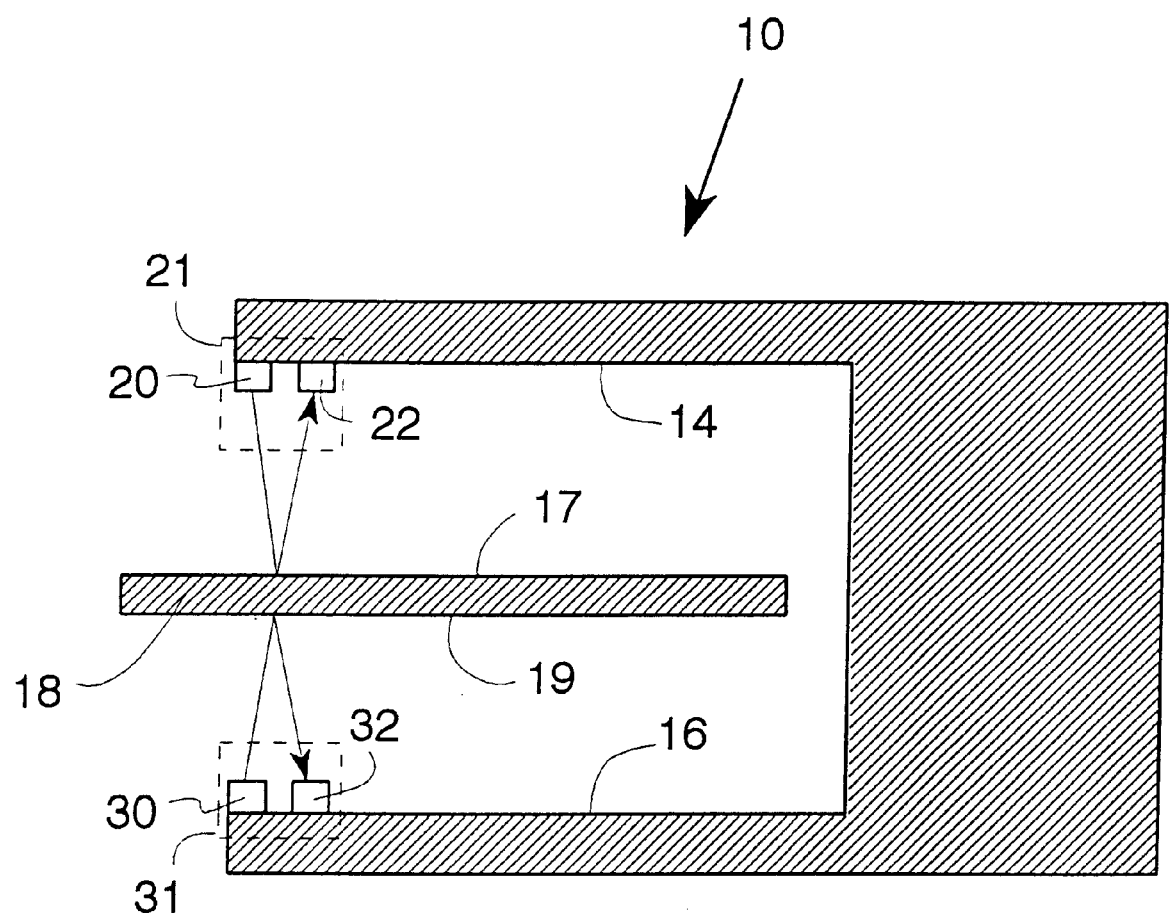
FIG. 2 is a side view of an optical measurement apparatus in accordance with the present invention.

Referring now to FIG. 2, a continuous sheet of material 18 is passed between a pair of optical measurement systems, 21 and 31, preferably, at a uniform rate of speed. Preferably, the optical measurement systems, 21 and 31, are attached to a unitary support structure 10. However, it is well within the scope of the invention to provide individually supported optical measurement systems positioned on opposite sides of the sheet material. Regardless of the support structure configuration employed, optical systems 21, 31 should be maintained in a stationary position during operation of the apparatus to reduce measurement error.

Sheet material 18 may comprise any of a host of materials which are produced in sheet form, including, but not limited to, paper, ceramic, aluminum, steel and glass. In contrast to known sheet thickness measurement technologies, the present invention is particularly suited for measuring the thickness of sheet materials having highly-reflective surfaces. Furthermore, in an alternate embodiment of the invention, the apparatus is adapted for measuring the thickness of sheet materials having a translucent surface coating disposed on at least one of the sheet surfaces 17, 19.

Support structure 10 has opposing surfaces, 14 and 16, to which optical systems 21 and 31 are mounted. Although a generally C-shaped support structure is depicted in FIG. 2, one skilled in the art will realize that numerous support structure modifications are possible without departing from the scope of the invention. For instance, instead of the C-shaped configuration illustrated in FIG. 2, a continuous ring-shaped structure completely surrounding the moving sheet could be employed.

Optical systems 21 and 31 comprise high power light sources 20 and 30, and photodetector arrays 22 and 32, respectively. Light sources 20 and 30, and photodetector arrays 22 and 32, can be attached to the support structure using any of various well known attachment means, including adhesives and mechanical fasteners. However, it is preferable that a method of attachment having sufficient flexibility to allow efficient replacement of the optical system components is employed. For instance, in the preferred embodiment of the invention, a detachable magnetic fixture (not shown) is used to attach the optical components to the support structure. It will occur to one skilled in the art that myriad magnetic fixture designs are possible. Regardless of the configuration employed, the optical components must fit snuggly in the fixture so that they do not shift during operation of the apparatus.

Light emitted from light source 20 is reflected off of upper sheet surface 17 and received by photodetector array 22. Simultaneously, light emitted from light source 30 is reflected off of lower sheet surface 19 and received by photodetector array 32. Preferably, light sources 20 and 30 are high-power laser diodes. As used herein, the term "high-power" refers to laser diodes in which the incident light beam emitted from the diodes has a power of at least approximately 30 mW. Light sources 20 and 30 can each comprise a single high-power light source. Alternatively, a plurality of light sources can be employed. In either instance, the total power of light reaching the particular sheet surface must be at least approximately 30 mW.

In comparison, known optical measurement systems generally incorporate light sources that operate at about 1 mW. The incorporation of a high-power light source in the present invention provides numerous advantages over prior art systems. First, increasing the power of the incident light beam results in a corresponding increase in the power of the beam reflected off of the surface being measured. This improved reflection is more easily and accurately detected by the photodetector array, thereby increasing measurement speed and accuracy, and enabling the measurement of sheet materials under optically-challenging conditions. For example, the optical apparatus of the present invention is operable in high-humidity and/or dusty environments.

The incorporation of a plurality of co-linear light sources can be used to reduce "speckle," a phenomenon well known in the field of optics which typically affects single light source systems. As used herein, the term "co-linear" is intended to encompass parallel light beams wherein the distance between adjacent beams is less than one micron. Speckle is the self-interference within a coherent single wavelength light beam as a result of path length differences of the constituent waves of the beam. For instance, the slightly different path lengths of light emerging from the top and bottom of a single laser diode result in interference of the individual beams. In the co-linear multiple beam arrangement, speckle from each wavelength of the multiple wavelength beam is essentially spatially independent. As a result, the speckle of the combined beam is averaged out by simultaneously measuring the laser beam profile of all of the wavelengths of the multiple wavelength beam using a non-wavelength selective detector. By incorporating the aforementioned co-linear multi-beam configuration and detecting the signal with a nonwavelength-selective detector, such as a silicon diode, the occurrence of speckle is greatly reduced. This method of reducing speckle is well known by those having ordinary skill in the field of optics. Where a plurality of individual light sources are employed, they are preferably mounted in an optical fixture (not shown) to maintain the co-linearity of the individual beams.

The light reflected off of the respective sheet surfaces has a diffuse and specular components. Specular reflection refers to that portion of the light that obeys Fresnel's laws of reflection, namely, that portion of the light for which the angle of incidence equals the angle of reflection. Specular reflection is the dominant effect on metallic surfaces. For instance, approximately 96% of visible light directed toward a highly-polished aluminum surface is specularly reflected. In comparison, diffuse reflection is a virtually instantaneous surface absorption and re-emission. The directional properties of diffuse reflection are generally described by Lambertian scattering. Materials that do not have highly-reflective surfaces, such as graphite, have high diffuse reflective portions.

The diffuse portion of the reflected light beams are received by the respective photodetector arrays 22, 32. In the preferred embodiment of the present invention, the photodetector arrays are comprised of individual photodetectors integrated upon an IC chip. The integration of photodetectors on monocrystalline silicon is well known in the optics industry. Each photodetector communicates with current measurement and centroid measurement circuitry (not shown). Individual photodetectors, current measurement circuits, and a centroid measurement circuit are all integrated on a single integrated circuit (IC) chip. Therefore, each optical system 21, 31 includes a single integrated circuit chip for integrating the aforementioned photodetectors and circuitry.

Each photodetector communicates directly with a single current measurement circuit, and the current measurement circuits communicate in parallel with a single centroid measurement circuit. The operational speeds of known triangulation-based optical measurement systems are limited due to their incorporation of position-sensitive detectors having sequentially-addressed photodetectors, such as standard charged coupled detector (CCD) arrays. In contrast, the present invention incorporates position-sensitive detectors in which individual photodetectors are addressed simultaneously (i.e., in parallel). The operating speeds of known systems are further limited by their reliance on off-chip signal processing to calculate the reflected spot centroid. The instant invention avoids these problems, allowing up to approximately $10^9$ surface measurements per second, by simultaneously addressing each of the photodetectors of the photodetector array and then processing the resultant signals in parallel directly on the photodetector chip.

Figure 3:
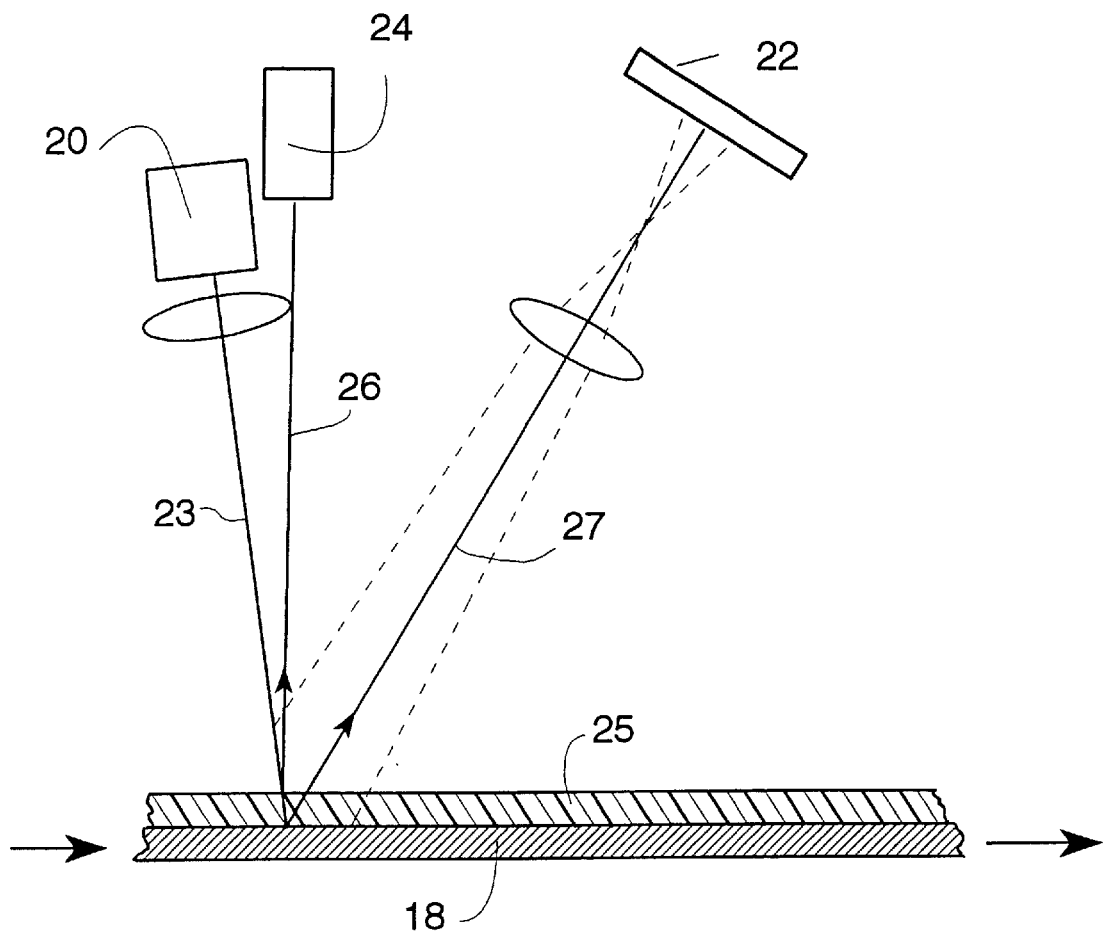
FIG. 3 is a side view of an optical measurement apparatus adapted for measuring sheet materials having a translucent outer layer, in accordance with an alternate embodiment of the present invention.

Referring now to FIG. 3, an alternate embodiment of the present invention incorporates at least one standard laser profilometer 24 to measure the thickness of a sheet surface having a translucent outer layer 25. For many common sheet material manufacturing operations where it is desirable to accurately measure sheet thickness, the sheet is covered with a translucent film. For instance, translucent lubricating films are commonly used to facilitate the process of sheet material rolling. Laser profilometers are uniquely suited for measuring the thickness of a translucent film layer disposed on a reflective sheet material. Standard profilometry systems perform such measurements using the specularly-reflected portion 26 of the incident light beam 23. Knowledge of the film refractive index, the angle of the incident light beam, and the relative positions of the reflected beams are sufficient to determine film thickness using a profilometer. The use of laser profilometers for measuring the thickness of translucent material layers on highly-reflective surfaces is well known in the art. The incorporation of a laser profilometer into the apparatus of the present invention provides a means for simultaneously measuring the thickness of the sheet 18 and translucent layer 25.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. An optical measurement apparatus for measuring the thickness of fast moving sheet material having opposite surfaces, the optical measurement apparatus having a pair of opposing optical systems, each optical system comprising:

a high-power light source, said light source for emitting a light beam toward a sheet material surface, at least a portion of said light beam reflecting off of said sheet material surface;

a plurality of photodetectors combined to form a photodetector array, said photodetector array for receiving a reflected portion of said light beam, said reflection imaged as a spot upon said photodetector array;

a plurality of current measurement circuits each simultaneously communicating in parallel directly with an individual photodetector; and, a centroid measurement circuit;

said plurality of current measurement circuits each simultaneously communicating in parallel an electrical signal to said centroid measurement circuit, said centroid measurement circuit processing the electrical signals in parallel to calculate the centroid of said spot.

2. An optical measurement apparatus as recited in claim 1, wherein said photodetectors, said current measurement circuits, and said centroid measurement circuit are integrated on a single integrated circuit (IC) chip.

3. An optical measurement apparatus as recited in claim 1, wherein said high-power light source comprises a laser light source operating at a power of at least approximately 30 mW.

4. An optical measurement apparatus as recited in claim 3, wherein said laser light source comprises a plurality of laser diodes emitting a plurality of substantially co-linear light beams having different wavelengths.

5. An optical measurement apparatus as recited in claim 4, wherein said photodetector array comprises nonwavelength-selective photodetectors.

6. An optical measurement apparatus as recited in claim 5, wherein said nonwavelength-selective photodetectors are silicon diodes.

7. An optical measurement apparatus as recited in claim 1, further comprising at least one laser profilometer.

8. An optical measurement apparatus for measuring the thickness of a fast moving sheet material, the apparatus comprising:

a support structure having opposing support surfaces;

a pair of high-power laser light sources each attached to one of said opposing support surfaces; and, a pair of photodetector arrays each attached to one of said opposing support surfaces, said photodetector arrays each integrated on a photodetector chip, each said photodetector chip having a plurality of current measurement circuits and a single centroid measurement circuit integrated thereon;

said photodetectors each simultaneously communicating in parallel with an individual current measurement circuit;

said current measurement circuits simultaneously communicating electrical signals in parallel to said centroid measurement circuit.

9. An optical measurement apparatus as recited in claim 8, wherein each said high power laser light source comprises an array of laser diodes operating at a total minimum power level of approximately 30 mW.

10. An optical measurement apparatus as recited in claim 9, wherein said laser diodes emit substantially co-linear light beams having different wavelengths.

11. An optical measurement apparatus as recited in claim 8, wherein said photodetectors are nonwavelength-selective.

12. An optical measurement apparatus as recited in claim 11, wherein said nonwavelength-selective detectors are silicon diodes.

13. An optical measurement apparatus as recited in claim 8, wherein light emitted by said high power laser light sources is reflected off of opposite surfaces of said moving sheet material and imaged as respective spots on said photodetector arrays.

14. An optical measurement apparatus as recited in claim 13, wherein the strength of said electrical signals simultaneously communicated in parallel from said current measurement circuits to said centroid measurement circuit are proportional to the intensity of light received by said photodetectors.

15. An optical measurement apparatus as recited in claim 8, further comprising at least one laser profilometer attached to at least one of said opposing support structure surfaces.

16. An optical measurement apparatus as recited in claim 8, wherein said photodetector arrays and said high-power laser light sources are attached to said opposing support surfaces using a magnetic fixture.

17. A method for optically-measuring the thickness of a moving sheet material having upper and lower opposite surfaces, comprising the steps of:

providing first and second light sources for emitting first and second high-power light beams;

directing said first and second high-power light beams toward the respective upper and lower sheet surfaces;

focusing the first and second light beams upon the respective upper and lower sheet surfaces;

reflecting the light beams off of the respective sheet surfaces, each said reflection having a diffuse portion and a specular portion;

receiving the diffuse portion of each reflected light beam at respective first and second photodetector arrays, each photodetector array having a plurality of simultaneously-addressed individual photodetectors;

simultaneously converting the reflected light received by each photodetector into an electrical signal;

processing the electrical signals in parallel on a single photodetector integrated circuit chip; and performing a triangulation calculation to calculate the thickness of said moving sheet material.

18. A method as recited in claim 17, wherein the steps of converting and processing are performed by current and centroid measurement circuitry integrated on said single photodetector integrated circuit chip.

19. A method as recited in claim 17, wherein the sheet material has a translucent layer disposed on at least one of the sheet surfaces, the method further comprising the steps of:

providing at least one laser profilometer, said at least one laser profilometer receiving a specular portion of one of said reflected light beams; and processing the received specular reflection to calculate the thickness of said translucent layer.

* * * * *